March 12, 1940. F. J. FIESER 2,192,968
FILTERING DEVICE
Filed Feb. 26, 1938
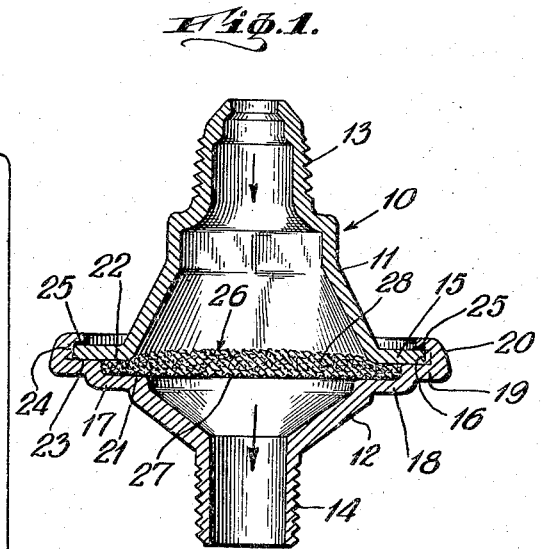
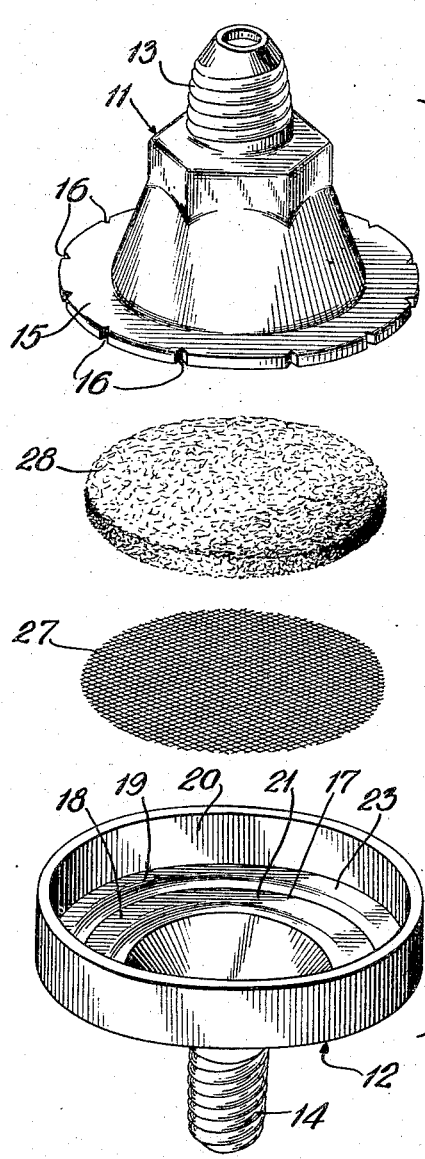
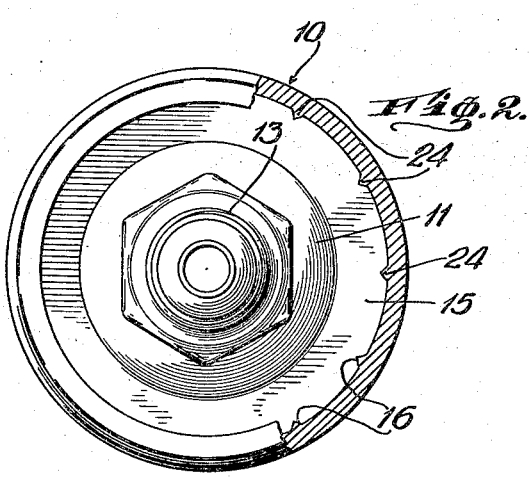
INVENTOR
FRANK J. FIESER
BY
his ATTORNEY Patented Mar. 12, 1940

2,192,968

UNITED STATES PATENT OFFICE 2,192,968

FILTERING DEVICE

Frank J. Fieser, Bronx, N. Y., assignor, by mesne assignments, to American Radiator & Standard Sanitary Corporation, New York, N. Y., a corporation of Delaware Application February 26, 1938, Serial No. 192,719

4 Claims. (Cl. 183—44)

My invention relates to filtering devices and more particularly to gas strainers which function to remove foreign particles from gas pipe lines.

An object of my invention is to provide a two-part simple and inexpensive form of gas strainer which may be readily connected into a gas pipe line without affecting the gas tight seal between parts.

The invention consists in the novel construction and combination of parts, to be more fully described hereinafter, and the novelty of which will be particularly pointed out and distinctly claimed.

In the accompanying drawing, to be taken as a part of this specification, I have fully and clearly illustrated a preferred embodiment of my invention, in which drawing—

Fig. 1 is a vertical longitudinal sectional view taken through the center of one preferred embodiment of my improved gas strainer;

Fig. 2 is a top plan view of the structure shown in Fig. 1 with portions being broken away to show the improved means for locking the two parts of the gas strainer against relative turning movement; and Fig. 3 is an exploded view illustrating the relationship between the several parts and also showing how the several parts are formed prior to final assembly.

Referring now in detail to the construction illustrated, the reference numeral 10 indicates, in its entirety, a gas strainer constructed in accordance with the present invention. The strainer 10 is here shown as comprising a pair of tubular metallic elements 11 and 12, respectively, connected together in end-to-end relation to form a hollow body. The element 11 is provided at its outer end with a screw-threaded pipe connection 13; and, similarly, the element 12 is provided at its outer end with a screw-threaded pipe connection 14. By means of the connections 13 and 14, the strainer 10 may be readily connected into a gas pipe line (not shown). I have indicated by the arrows in Fig. 1, the preferable direction of flow of the gas through the strainer 10.

The elements 11 and 12 may be formed from any suitable kind of wrought metal; for example, run-of-the-mill steel and the two elements formed by one or more forming steps such as stamping, as is well known in the art. The element 11 is formed with an annular integral flange 15 which extends radially outward from the inner end of the element and is provided at its periphery with a series of spaced notches 16, for a purpose which will presently appear. The element 12 is also formed at its inner end with an integral outwardly extending annular flange indicated at 17.

The flange 17 comprises three concentric annular portions indicated at 18, 19 and 20, respectively, which are spaced radially from one another, as shown. The inner annular flange portion 18 is formed with an inner planar face 21, which is arranged in spaced opposed and parallel relation with respect to a portion 22 of the inner face of the annular flange 15. The intermediate annular flange portion 19 is provided with an inner planar face 23, which is arranged in abutting face-to-face relation with a portion of the inner face of the flange 15. The outer or peripheral flange portion 20 is so formed that it embraces the peripheral portions of the flange 15.

As will appear more fully hereinafter, the peripheral flange portion 20 is so formed that portions 24 of the metal thereof, are disposed within the spaces 16 of the flange 15. On account of this latter relationship relative turning movement between the elements 11 and 12 is prevented after the elements have once been assembled and secured together. Without the notches 16 and portions 24, relative turning movement between the elements might be caused by the act of connecting or disconnecting the strainer into a pipe line.

A gas-tight seal between the engaging surfaces of the two flanges 15 and 17 is provided by applying a suitable sealing compound to at least one of the surfaces. Examples of such a compound are red lead and joint cement. The sealing compound is indicated at 25. When the engaging surfaces of the flanges 15 and 17 are secured together, in a manner to be described presently, the sealing compound 25 will prevent gas leaks between these surfaces, and the interlocking provided by the metallic portions 24 within the notches 16 will prevent relative turning movement of the elements 11 and 12, such as would destroy this gas-tight seal.

In order to provide for the effective removal of foreign particles from the gas stream flowing through the strainer 10, a filtering means 26 is arranged across the interior of the strainer at the juncture of the elements 11 and 12, and such filtering means is tightly held at its periphery by the spaced opposed faces 21 and 22 of the flange portion 18 and the flange 15. In so far as the present invention is concerned, the filtering means 26 may be formed in any suitable manner. By way of example, I have indicated the filtering means 26 as comprising a metallic screen 27 in the form of a disc and arranged at the downstream side of the filter 26, and a pad of filtering material 28 of any suitable material also in the form of a disc and arranged at the upstream side of the screen 27.

In Fig. 3, I have shown the parts 11 and 12 as they are formed by one or more stamping steps and prior to their being assembled and secured together in the manner shown in Figs. 1 and 2. The flange portion 20 of the element 12 is shown in Fig. 3 as being in the form of an upstanding annular ring. In assembling, the screen 27 is placed on the surface 21 and the pad 28 superimposed on the screen. The element 11 is then fitted into the element 12 with the peripheral portions of the flange 15 inside of the flange 20, and with the surface 23 in engagement with the inner face of the flange 15. The structure thus assembled is then placed into a suitable machine where the upper part of the flange portion 20 as viewed in Fig. 3, is rolled over the periphery of the flange 15 and firmly against the outer or upper surface of the flange 15 as shown in Figs. 1 and 2. This rolling-over step may be performed in a plurality of stages, and, if desired, the sealing compound 25 may be applied to the upper part of flange 20 just prior to the final stage where it is forced into direct contact with the flange 15. Thus, the two elements 11 and 12 are securely clinched together and the sealing compound 25 provides a gas-tight seal. The rolling-over step is, as is well known, effected under great pressures and as the step is being performed, portions 24 of the metal of the flange portion 20 are formed and forced into the notches 16 and thus provide the above described interlocking between the elements 11 and 12. This rolling or clinching step also causes the surfaces 21 and 22 of the flange portion 18 and flange 15 to grip firmly the peripheral portions of the filtering means 26 and thus hold the latter tightly in place.

The gas strainer 10 thus constructed is capable of being produced in large quantities and the steps used in forming the elements 11 and 12 and in assembling these elements together are relatively simple and can be effected at a low cost. Thus, the cost of producing the gas strainer 10 can be reduced to such a value that when the filtering means 26 becomes clogged with foreign particles, the entire strainer may be disconnected from the pipe line and thrown away, and a new strainer substituted therefor, without material cost to the consumer.

What I claim and desire to secure by Letters Patent of the United States is:

1. A gas strainer adapted to be connected into a pipe line and comprising a pair of metallic tubular elements connected together in end-to-end relation to provide a hollow body and being provided, respectively, with pipe connections at their outer or free ends; one of said tubular elements being provided with an integral annular connecting flange extending outwardly from the inner end thereof and said connecting flange having spaced notches formed in the periphery thereof; the other of said tubular elements being provided at its inner end with an integral annular connecting flange including a peripheral portion embracing the periphery of the first-named connecting flange and being formed with portions of the metal thereof disposed within said peripheral notches so as to prevent relative turning movement of said elements when being connected and disconnected into a pipe line; and filtering means arranged within said body and transverse to the longitudinal axis thereof and being held at its periphery by opposed spaced surfaces of said connecting flange portions.

2. A gas strainer adapted to be connected into a pipe line and comprising a pair of metallic tubular elements connected together in end-to-end relation to provide a hollow body and being provided, respectively, with pipe connections at their outer or free ends; one of said tubular elements being formed with an integral annular connecting flange extending outwardly from the inner end thereof and said connecting flange having spaced notches formed in the periphery thereof; the other of said tubular elements being formed at its inner end with an integral connecting flange including an inner flat annular portion arranged in abutting face-to-face sealing contact with said first-named connecting flange and an outer annular peripheral portion embracing the periphery of said first-named connecting flange and being formed with portions of the metal thereof disposed within said peripheral notches so as to prevent relative turning movement of said pair of elements when being connected and disconnected into a pipe line; and filtering means arranged within said body at the juncture of said elements and arranged transversely of the longitudinal axis thereof and being held at its periphery by opposed spaced surfaces of said connecting flanges.

3. A gas strainer adapted to be connected into pipe lines and comprising a pair of tubular metallic elements connected together in end-to-end relation to provide a hollow body and being provided, respectively, at their outer or free ends with pipe connections; one of said tubular elements being formed with an integral annular connecting flange extending outwardly from the inner end thereof; the other of said elements being formed with an integral annular connecting flange extending outwardly from its inner end; the flange of said other element comprising an inner annular flange portion arranged in spaced opposed relation with respect to a portion of said first-named connecting flange, an intermediate annular flange portion spaced radially from said inner portion and arranged in face-to-face abutting contact with a portion of said first-named connecting flange, and an outer annular peripheral flange portion spaced radially from the intermediate portion and embracing the periphery of said first-named connecting flange; interlocking means between the engaging surfaces of said connecting flanges to prevent relative turning movement of said elements and filtering means extending across the interior of said hollow body and being held at the periphery thereof by the opposed spaced surfaces of said inner annular flange portion and said first-named connecting flange.

4. A gas strainer adapted to be connected into pipe lines and comprising a pair of tubular metallic elements connected together in end-to-end relation to provide a hollow body and being provided, respectively, at their outer or free ends with pipe connections; one of said tubular elements being formed with an integral annular connecting flange extending outwardly from the inner end thereof and having spaced notches formed in the periphery thereof; the other of said elements being formed with an integral annular connecting flange extending outwardly from its inner end; the flange of said other element comprising an inner annular flange portion arranged in spaced opposed relation with respect to a portion of said first-named connecting flange, an intermediate annular flange portion spaced radially from said inner portion and arranged in face-to-face abutting contact with a portion of said first-named connecting flange, and an outer annular peripheral flange portion spaced radially from the intermediate portion and embracing the periphery of said first-named connecting flange and being formed with portions of the metal thereof disposed within said spaced notches so as to prevent relative turning movement of said elements; and filtering means extending across the interior of said hollow body and being held at the periphery thereof by the opposed spaced surfaces of said inner annular flange portion and said first-named connecting flange.

FRANK J. FIESER.